(12) United States Patent
Syassen

(10) Patent No.: US 8,864,082 B2
(45) Date of Patent: Oct. 21, 2014

(54) DEVICE FOR REDUCING THE AERODYNAMIC DRAG OF A LEADING SURFACE OF AN AIRCRAFT

(75) Inventor: Freerk Syassen, Stadland (DE)

(73) Assignee: Airbus Operations GmbH, Hamburg (DE)

( * ) Notice: Subject to any disclaimer, the term of this patent is extended or adjusted under 35 U.S.C. 154(b) by 658 days.

(21) Appl. No.: 12/783,856

(22) Filed: May 20, 2010

(65) Prior Publication Data

US 2010/0294892 A1 Nov. 25, 2010

Related U.S. Application Data

(60) Provisional application No. 61/179,723, filed on May 20, 2009.

(30) Foreign Application Priority Data

May 20, 2009 (DE) .......................... 10 2009 022 174

(51) Int. Cl.
*B64C 21/06* (2006.01)

(52) U.S. Cl.
CPC ............... *B64C 21/06* (2013.01); *Y02T 50/166* (2013.01); *B64C 2230/22* (2013.01)
USPC .......................................................... 244/209

(58) Field of Classification Search
USPC .................................. 244/201, 204, 208, 209
See application file for complete search history.

(56) References Cited

U.S. PATENT DOCUMENTS

| | | | | |
|---|---|---|---|---|
| 5,263,667 A | * | 11/1993 | Horstman | 244/209 |
| 5,366,177 A | * | 11/1994 | DeCoux | 244/201 |
| 7,766,280 B2 | * | 8/2010 | Cloft et al. | 244/208 |
| 2009/0212165 A1 | * | 8/2009 | Parikh | 244/209 |
| 2012/0037760 A1 | * | 2/2012 | Koppelman et al. | 244/209 |

* cited by examiner

*Primary Examiner* — Valentina Xavier
(74) *Attorney, Agent, or Firm* — Leydig, Voit & Mayer, Ltd.

(57) ABSTRACT

A device for reducing the aerodynamic drag of a leading surface of an aircraft includes at least one air permeable structure disposed in an area of the leading surface and a suction device configured to interact with the at least one air permeable structure.

9 Claims, 3 Drawing Sheets

US 8,864,082 B2

DEVICE FOR REDUCING THE AERODYNAMIC DRAG OF A LEADING SURFACE OF AN AIRCRAFT

CROSS REFERENCE TO PRIOR APPLICATIONS

Priority is claimed to German Patent Application No. DE 10 2009 022 174.3, filed May 20, 2009 and U.S. Provisional Application No. 61/179,723, filed May 20, 2009. The entire disclosure of both applications is incorporated by reference herein.

The invention relates to a device for reducing the aerodynamic drag of a surface area, in particular in an area of a vertical tailplane, an airfoil, a fuselage section, and/or a horizontal tailplane of an aircraft.

BACKGROUND

In order to further optimize the fuel consumption of commercial aircraft, the manufacturer is attempting to reduce the aerodynamic drag of key aerodynamic effective surfaces, such as the leading edges of the airfoils, the front edge of the horizontal tailplane, or the leading edge of the vertical tailplane. Undesired turbulent flows exist in the area of the leading edges in a region near the surface, which increase aerodynamic drag, and consequently the fuel consumption of the aircraft.

In order to reduce the aerodynamic drag, it is necessary that the turbulent flows in a region near the surface of the aerodynamic effective surfaces of an aircraft be significantly reduced. For example, technologies from the area of bionics can be used for this purpose. It is known to provide airfoils of aircraft with coatings having a surface quality made to mimic the skin structure of sharks, for example. The disadvantage here is that the coatings, for example which can be applied as plastic films or paints, are subject to strong erosive processes during flight operations, which are associated with considerable wear, and require a resultant high maintenance outlay, the costs of which can at least partially nullify the achievable savings in fuel again.

Another alternative is to give the leading edges of the relevant aerodynamic effective surfaces a sandwich design, so as to form a plurality of cavities. In this alternative, the area of the leading edges has a micro-perforation, through which the inflowing air gets into the cavities lying further back, and from there can be centrally suctioned by means of a pump to reduce the aerodynamic drag. Because the cavities each have boreholes with a diameter that varies from cavity to cavity, different pressures come about in the cavities. As a result, varying volumetric air flows pass through the cavities, despite the central suction. However, the disadvantage in this embodiment is predominantly the sandwich design of the leading edges of the aerodynamic effective surfaces, which is technically extremely demanding to manufacture. The area in which the inflowing air is suctioned near the surface is not confined to the area of the leading edges of the respective aerodynamic effective surface.

SUMMARY OF THE INVENTION

Therefore, an aspect of the invention is to provide a device for reducing the aerodynamic drag of aerodynamic effective surfaces, which is virtually maintenance-free, and requires only a minimal production outlay.

The fact that at least one air-permeable structure is situated at least regionally in the area of the leading surface and interacts with an suction device makes it possible to suction a portion of the inflowing air with the suction device, thereby reducing the turbulent flow of air in an area of the leading surface near the surface, and lower the aerodynamic drag and hence fuel consumption of the aircraft. Using the structure eliminates the need for the sandwich design in fabricating the hollow cavities, which had previously been virtually impossible to control from a production standpoint, and was very cost intensive.

In a further development of the device, at least two air-permeable structures each with varying aerodynamic drags are arranged in the area of the leading surface.

As a result, for example in the area of a leading edge of a vertical tailplane, a higher suction power can be generated by comparison to the lateral surfaces adjoining the latter, so as to be able to more effectively reduce the turbulent flow that is most prominent in the area of the leading edge of the vertical tailplane. In the areas behind the two structures, the varying flow resistances give rise to respective locally differing volumetric flows $\dot{V}$ of air passing through them, even though the device as a rule only has a central suction device, with which only one negative pressure value can currently be set in a range of between −0.01 bar to −0.7 bar.

In another advantageous embodiment of the device, at least one air-permeable structure is a metallic tissue, which is formed with a high-grade steel alloy and/or with a titanium alloy.

This makes it possible to use industrially available standard metallic tissues to fabricate the structure. In addition, the flexibility of the metallic tissue enables simple integration into the leading surface, which generally has a surface geometry curved in at least one spatial dimension. Possible materials for the metallic tissue include in particular high-grade steel alloys and/or titanium alloys, which are processed into wires and yield the metallic tissue when woven together. By varying the wire diameter and/or mesh width of the metallic tissue, the resultant flow resistance of the metallic tissue can be precisely set within broad limits. In addition, the mentioned materials offer good corrosion resistance, enabling lifelong, maintenance-free use. Further, using the metallic tissue improves the resistance against impact with foreign bodies (so-called "impact" behavior). There are weight advantages to using titanium alloys instead of high-grade steel alloys.

In an alternative embodiment, the metallic tissue can also consist of at least two layers. In such a constellation, a first regulating layer is used to set a locally defined volumetric flow for the air passing through, while a carrier layer that is situated under the latter, is preferably applied to the entire surface of the regulating layer, and put together with a coarser metallic tissue essentially serves solely to provide mechanical stabilization.

As an alternative, the air-permeable, sieve or tissue-like structures can be made out of thermoplastic and/or duroplastic plastic materials, if necessary with additional fiber reinforcement. This offers weight advantages by comparison to metallic materials.

Further, the air-permeable structures can be fabricated using a plurality of microscopic spherules, which are each interconnected in a spatial arrangement that ideally corresponds to the densest possible sphere packing. The spherules can consist of metallic materials and/or plastic materials. The connection between the spherules can be established via welding, soldering, adhesive bonding, sintering ("baking") or the lake.

Another embodiment provides that the at least one structure is covered at least regionally by a perforated layer with a plurality of boreholes, wherein the perforated layer is made out of a titanium and/or high-grade steel alloy.

The perforated layer ensures that a prescribed, constant share of the inflowing air will hit the structure in a uniformly distributed way. Using at least two air-permeable metallic tissues each varying in mesh width, which lead to regionally varying flow resistances, makes it possible to set the volumetric flows or local pressures of the air passing through that locally vary in the area of the structure. Fiber-reinforced plastic materials are only conditionally suitable for manufacturing the perforated layer or woven structure, since unavoidable erosive processes continuously erode the resin matrix during flight operations, and the reinforcing fibers are exposed, impairing the integrity and mechanical load bearing capacity of the fiber composites.

The perforated layer can be omitted if the single or multi-layer metallic tissue has a sufficiently smooth surface geometry that satisfies the aerodynamic requirements in the inflowing direction. The same holds true for cases where the air-permeable structure in an alternative embodiment consists of a plurality of microscopic spherules baked together.

As a rule, the perforated layer has several million boreholes per square meter, each with a diameter of 30 µm to 80 µm at a distance of up to 500 µm, which can be arranged in a uniform grid. Depending on the local flow conditions, locally varying borehole densities can also be provided. For example, the required high number of boreholes can be generated via known electron beam or laser drilling procedures.

A further development of the device provides that the at least one structure and/or perforated layer are secured in an area of the leading surface by a substructure.

The substructure serves only to mechanically support the metallic tissue and/or perforated layer, but no longer to provide a plurality of cavities, in which respectively varying pressures predominate, or through which different levels of volumetric air flows $\dot{V}pass$.

One further development provides that the at least one structure and/or perforated layer are essentially always inserted in the surface geometry of the leading surface.

As a result of this configuration, the aerodynamic properties remain unchanged, especially in a transitional area between the device and the remaining zones of the leading surface.

Another advantageous embodiment provides that the suction device is a pump, in order to generate a negative pressure $p_0$ in a region behind the structure.

The suction device is preferably a (vacuum) pump driven by an electric motor. This central pump makes it possible to set an approximately uniform negative pressure $p_0$ in a range of about −0.01 bar up to −0.7 bar behind the metallic tissues of the device. The preferably envisaged use of an electric motor for driving the vacuum pump above all facilitates the actuation and regulation of the pump. As an alternative, a hydraulic drive can also be provided. The pump can also be positioned far outside the region of the leading surface, for example inside the tail area of the aircraft fuselage section. However, in this case, a sheathed flexible cable must be installed between the pump and region immediately behind the metallic tissues.

Another advantageous embodiment provides that the negative pressure $p_0$ can be adjusted by means of a controlling and/or regulating device.

As a result, the pump can be variably actuated within the suction device as a function of the respective flight status of the aircraft, for example as a function of flight speed, flight altitude and/or other parameters, so as to bring about the desired reduction in aerodynamic drag of the leading surface by weakening turbulent flows near the surface in all conceivable flight situations.

DETAILED DESCRIPTION

Figure 1:
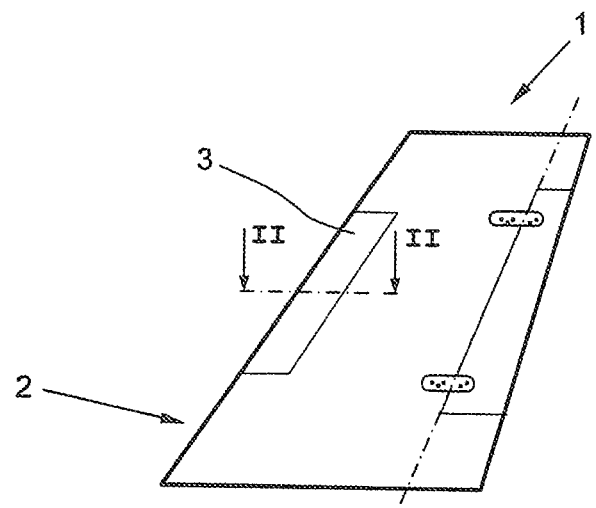
FIG. 1-3, a basic view showing the function of a device for reducing the aerodynamic drag of a vertical tailplane of an aircraft according to prior art, FIG. 4, a perspective view of a section of a vertical tailplane of an aircraft, which is provided with the device designed according to the invention, and FIG. 5, the section V from FIG. 4 on a magnified scale.
Figure 2:
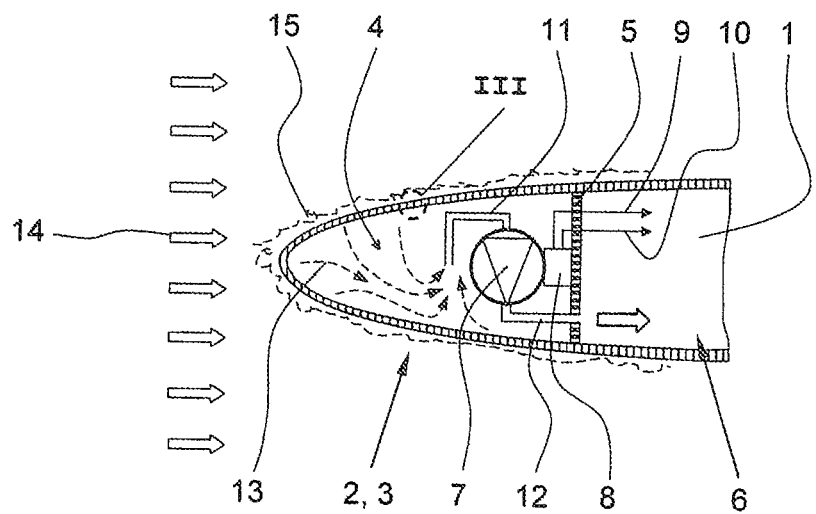
Figure 3:
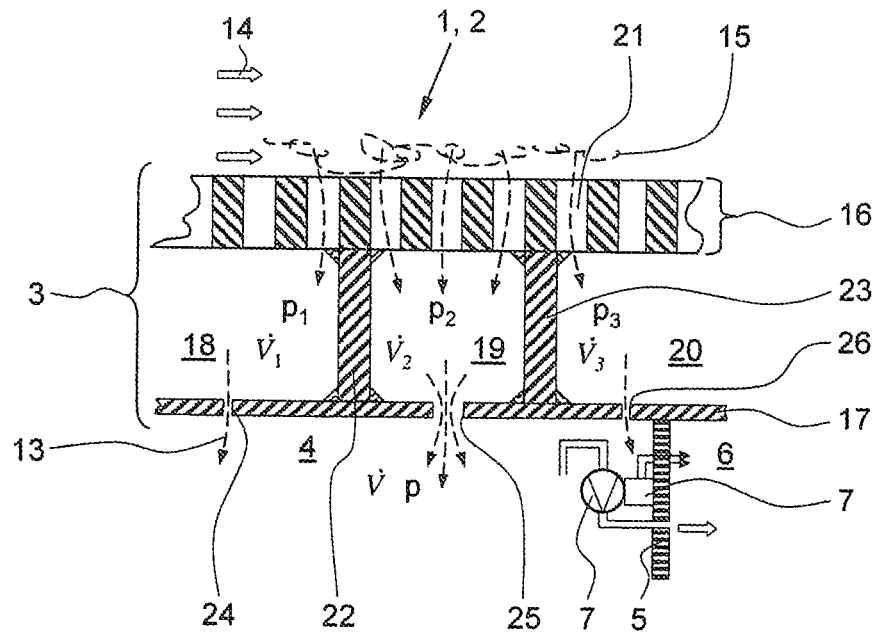

FIGS. 1 to 3, to which reference will be made simultaneously further on in the specification, illustrate the basic function of a device known from prior art for reducing the aerodynamic drag of leading surfaces.

FIG. 1 depicts a side view of a vertical tailplane 1 of an aircraft (not shown). A device 3 for reducing aerodynamic drag fabricated based on prior art is located in an area 2, for example of a leading edge or nose region, of the vertical tailplane 1. The device 3 can extend over the entire length of the area 2 of the vertical tailplane without detriment to the depiction.

FIG. 2 shows a sectional view through the vertical tailplane 1 along sectional line II-II on FIG. 1. The area 2 has a known sandwich design in the area of the device 3, meaning it consists of a dual shell. A pump 7 as the suction device is situated in a front space 4, which is separated from a rear space 6 by a frame 5. The pump 7 is powered by an electric motor 8 hooked up to two electrical lines 9, 10. The pump 7 has a suction line 11 and pressure line 12. The pump 7 can be used to remove a defined share of the air flow 13 that gets into the front space 4 through the dual-shelled area 2 via the section line 11 and convey it into the rear space 6, as indicated by the small white arrow. The initially still laminar air flow 14 that hits the vertical tailplane 1 is denoted by a plurality of white arrows. As a result of the suctioning, in particular the turbulent air flow 15 near the surface in the inflow region of the device 3 can be reduced, so that the aerodynamic drag of the vertical tailplane 1 diminishes.

FIG. 3 presents a highly magnified view of the circular section III on FIG. 2. The dual-shelled structural design of the area 2 of the vertical tailplane 1 encompasses a perforated layer 16, which runs spaced approximately parallel to an inner wall 17. A plurality of cavities 18 to 20 are situated between the outwardly directed perforated layer 16 and the inner wall 17. The initially still laminar air flow 14 runs approximately parallel to the perforated layer 16 on FIG. 3. The perforated layer 16 has a plurality of microscopic, continuous boreholes, of which a single borehole marked 21 is representative for all remaining boreholes. The boreholes each have a diameter of approx. 50 µm, and are incorporated in a uniform, i.e., grid-like, manner at a distance of up to 500 µm relative to each other, distributed over the perforated layer 16. The perforated layer 16 preferably has a borehole density of more than 4,000,000 boreholes per square meter. Cavities 18 to 20 are each separated from each other by a web 22, 23. The cavities 18 to 20 incorporate a respective nozzle 24 to 26. A different pressure $p_1$ to $p_3$ prevails inside the cavities 18 to 20, thereby yielding a varying suction effect in the corresponding areas of the perforated layer 16, and hence a locally varying reduction in the turbulent flows. For example, the turbulent air flow 15 is the strongest directly in the region of the leading edge of the vertical tailplane, so that the suction must be strongest in this area, while the turbulent flows are weaker in the less curved areas of the two lateral surfaces of the vertical tailplane 1 that adjoin on either side, so that a lower suction power is sufficient in these zones.

Pressures $p_1$ to $p_3$ can fluctuate within a range of $-0.7$ bar and $-0.01$ bar, wherein the suction effect is amplified at lower (i.e., negative) pressures. Three volumetric flows $\dot{V}_1$, $\dot{V}_2$ and $\dot{V}_3$ correspond to the different pressures $p_1$ to $p_3$, the magnitude of which as measured in cm3/s increases with decreasing pressure. The three volumetric flows $\dot{V}_1$, $\dot{V}_2$ and $\dot{V}_3$ represent a gauge for the respective quantity of air passing through the three cavities 18 to 20 per unit of time. The varying pressures $p_1$ to $p_3$ and the associated volumetric flows $\dot{V}_1$ to $\dot{V}_3$ are regulated by the three nozzles 24 to 26, which each vary in diameter for this purpose.

Both the perforated layer 16 and the inner wall 17 including webs 22, 23 are made out of metallic materials, for example with high-grade steel alloys or titanium alloys, which are each joined together via high-precision welding or soldering. When using titanium alloys, cavities 18 to 20 can also be fabricated in super-plastic molding processes. However, fabricating the device 3 in the area 2 of the vertical tailplane is so expensive and exacting from a production standpoint, in particular in view of the bonding technology required and the extreme accuracy that the aerodynamics demand for the surface geometry of the device 3, has yet to be done on a wide scale in practice, at least as relates to civil aviation.

Figure 4:
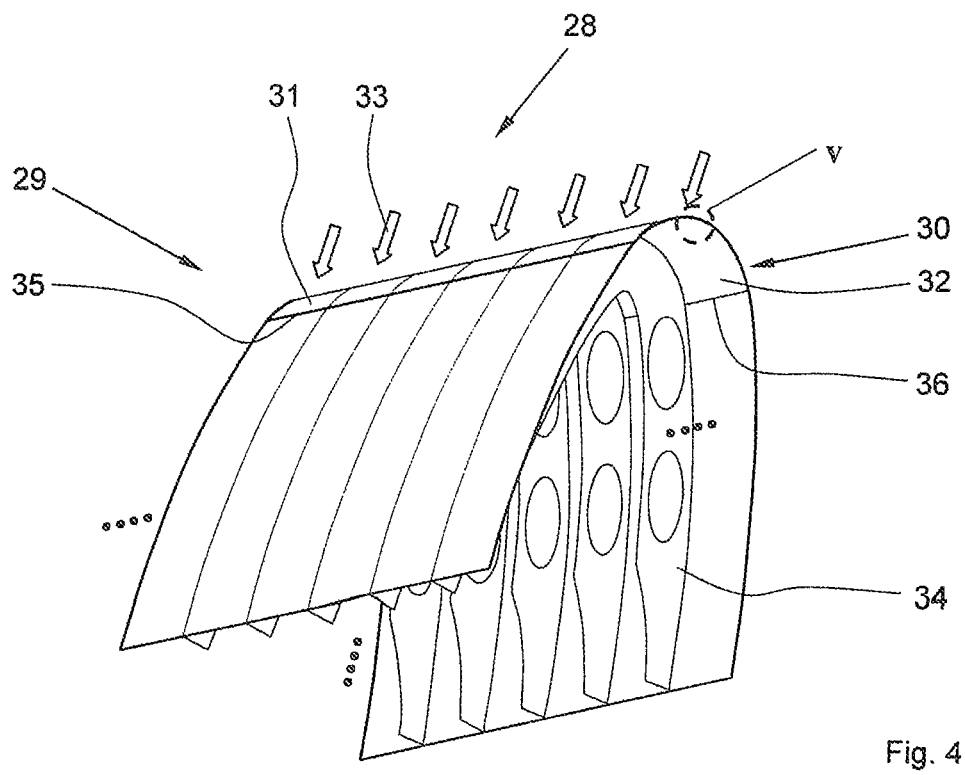

FIG. 4 shows a perspective view of a section of a vertical tailplane exemplarily equipped with a device designed according to the invention for reducing the aerodynamic drag.

In an area 29, for example in a nose section of a vertical tailplane 28, the vertical tailplane 28 is equipped with a device 30 designed according to the invention for reducing the aerodynamic drag. The section depicted on FIG. 4 extends both left to right as well as up and down, as respectively shown by the black dots. The suction device in the form of a (vacuum) pump is not shown to provide a better illustrative overview (see FIG. 5 in this regard). Among other things, the actual device 30 encompasses a perforated layer 31 arranged on the outside in area 29, and a metallic tissue 32 adjoining it on the inside as the air-permeable structure. The metallic tissue 32 preferably abuts the entire surface of the perforated layer 31. The metallic tissue 32 consists of a plurality of metallic wires interwoven to form a fabric. Varying the wire diameter and/or the weave or braiding makes it possible to set a mesh width of the metallic tissue in such a way as to allow a precisely defined volumetric air flow to pass through the latter. As a result, the metallic tissue 32 experiences a pressure drop, meaning the (air) pressure in the area of an initially still laminar air flow 33 that hits the perforated layer 31 is higher than the (air) pressure directly behind the metallic tissue 32. Both the perforated layer 31 and the metallic tissue 32 are preferably made out of a titanium alloy and/or high-grade steel alloy. In general, the perforated layer 31 is formed with a titanium alloy, wherein the metallic tissue 32 is made out of a high-grade steel alloy primarily for production-related reasons. The perforated layer 31 incorporates a plurality of microscopic boreholes having a diameter of up to 50 μm, which are arranged uniformly in a grid spaced apart from each other with a mesh width of up to 500 μm, wherein the grid reaches a borehole density preferably exceeding 4,000,000 boreholes per square meter. The boreholes are introduced into the perforated layer 31 via known electron beam or laser drilling procedures. In ideal cases, the surface geometry of the perforated layer 31 and metal tissue 32 is completely encompassed by a surface geometry of the vertical tailplane 28 so as to ensure optimal aerodynamic properties. The perforated layer 31 and metallic tissue 32 are supported by a substructure 34 located on the interior, inside the vertical tailplane 28. The metallic tissue 32 makes it possible to resort to the standard substructure usual in vertical tailplanes, for example ribs and frames, which is easier to control from a production standpoint by comparison to the previously required dual-shelled or sandwich design for the area 29 of the vertical tailplane 28. The substructure can also be made out of a titanium alloy. For example, the flexibility of the metallic tissue 32 makes it easy to stretch the latter over the substructure 34. A small number of support points on the substructure 34 is sufficient to establish the prescribed, as a rule at least one-dimensionally curved surface geometry of the area 29. In the area of the transverse edges 35, 36 of the metallic tissue 32, the latter can then be screwed to the substructure 34 to secure the location, for example by means of clamping strips that seal flush with the lateral surfaces of the vertical tailplane 28. The clamping strips can simultaneously be used to fix the perforated layer 31 usually still required above the tissue layer 32 in position on the vertical tailplane 28. This structural attachment additionally also makes it possible to easily and quickly change out both the metallic tissue 32 and the perforated layer 31 during maintenance and repair work.

The (vacuum) pump not shown on FIG. 4 can be arranged in the area of the device 30. As an alternative, it is also possible to position the (vacuum) pump underneath the vertical tailplane 28, for example in the rear area of the fuselage section of the aircraft.

Figure 5:
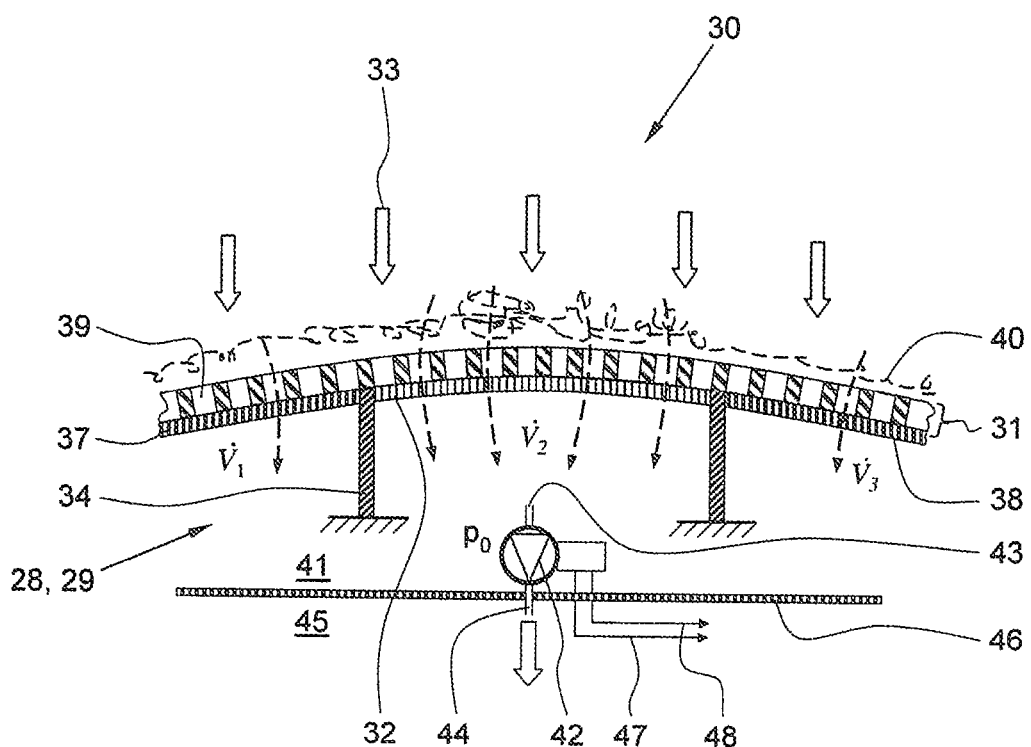

FIG. 5 shows the section V from FIG. 4 on a magnified scale.

The device 30 is integrated into an area 29 that can be a nose section of the vertical tailplane 28, for example. Among other things, the device 30 encompasses the perforated layer 31, adjoined to the back by the metallic tissue 32 as well as two additional metallic tissues 37, 38 respectively adjoined thereto on both sides, which also comprise air-permeable structures. The positioning of the device 30 in a nose section or leading edge of the vertical tailplane 28 as exemplarily shown on FIG. 5 makes it possible to provide it in and/or on any surface areas of the vertical tailplane and other aerodynamic effective surfaces, for example airfoils, horizontal tailplanes, landing flaps or the like, depending on the respective aerodynamic requirements. For example, the device 30 can also be integrated into the opposing lateral surfaces of the vertical tailplane 28, which are curved to a significantly less degree by comparison to the nose or leading edge area of the vertical tailplane 28.

The outlying perforated layer 31 first exposed to the air flow 33 along with the metallic tissue 32, 37, 38 are secured to the substructure 34. The perforated layer 31 has a plurality of microscopic cylindrical boreholes, of which one borehole is provided with a reference number representative for all remaining ones. The boreholes can be provided with a countersink on the side of the perforated layer 31 facing the inflowing air 33. The central metallic tissue 32 has a larger mesh width than the two outer metallic tissues 37, 38, which in the exemplary embodiment shown have the same mesh width. As a result, the metallic tissue 32 is traversed by the volumetric flow $\dot{V}_2$, which is greater than the here identical volumetric flows $\dot{V}_1$, $\dot{V}_3$, which pass through the metallic tissue 37, 38. As a result, a higher suction power arises in the area of metallic tissue 32 by comparison to the two outer metallic tissues 37, 38. This yields an air flow 40 that varies spatially in strength through the metallic tissues 32, 37, 38. Since the volumetric flow $\dot{V}_2$ in the area of the metallic tissue 32 is highest based on its larger mesh width by comparison to the two outer volumetric flows $\dot{V}_1$, $\dot{V}_3$, the greatest (air) suction power arises in this area as well, which in turn is accompanied by the largest reduction in the turbulent flow 40 near the surface to be reduced. By contrast, a diminished suction power arises in the area of the two outer metallic tissues 37, 38 owing to the smaller mesh width there, so that the reduction in turbulent flow 40 near the surface is correspondingly weaker in this area, although this is the intent, since the turbulent flow 40 in this zone is distinctly less strong in comparison go the central area. This weakening results from the larger bending radii of the surface geometry of the area 29 in this zone. In light of the specifically graded mesh widths of the metallic tissues 32, 37 and 38, which result in varying flow resistances, and hence in different volumetric flows $\dot{V}_1$, $\dot{V}_2$ and $\dot{V}_3$, the required suction power can be adjusted and optimized in a locally controlled manner, in the final analysis yielding a lower weight of the suction device and an associated diminished energy use. As a result, the device 30 permits an extremely energy-efficient reduction in the aerodynamic drag of the area 29 of the vertical tailplane 28. Just using the device 30 in a vertical tailplane 28 makes it possible to lower the fuel consumption of an aircraft by up to 10%.

The actual suctioning of air takes place from an intermediate space 41 behind the metallic tissues 32, 37, 38 by means of a (vacuum) pump 42, which preferably is electrically powered. The pump 42 has a tubular suction line 43, through which the air is suctioned out of the intermediate space 41, as well as a pressure line 44, with which the suctioned air is conveyed into a rear space 45 as denoted by the white arrow pointed vertically downward, wherein the rear space 45 is separated pressure-tight from the intermediate space 41. The pump 42 causes an approximately uniform pressure $p_0$ to become established in the intermediate space 41. This (negative) pressure $p_0$ generated and sustained by the pump 42 lies in a range of between −0.01 bar and −0.07 bar. Even though an approximately identical pressure $p_0$ prevails in the intermediate space 41, the different mesh widths selected according to the invention and the resultant varying flow resistances of the metallic tissue 32, 37, 38 produce different volumetric flows 1 to $\dot{V}_3$, which lead to the desired, locally differentiated suction power above the area 29.

The pump 42 further has two electrical lines 47, 48, which are used to supply energy and control the suction power via a controlling and/or regulating device (not shown). The conveying capacity of the pump 42 is generally varied by the controlling and/or regulating device as a function of flight parameters in the respective operating state of the aircraft. Examples of flight parameters include the flight altitude, flight speed, atmospheric temperature, atmospheric humidity, and atmospheric pressure at flight altitude.

REFERENCE LIST

1 Vertical tailplane
2 Area (vertical tailplane)
3 Device
4 Front space
5 Frame
6 Rear space
7 Pump
8 Electric motor
9 Electrical line
10 Electrical line
11 Suction line
12 Pressure line
13 Air (front space)
14 Air flow (laminar)
15 Air flow (turbulent)
16 Perforated layer
17 Inner wall
18 Cavity
19 Cavity
20 Cavity
21 Borehole (perforated layer)
22 Web
23 Web
24 Nozzle
25 Nozzle
26 Nozzle
28 Vertical tailplane
29 Area (vertical tailplane)
30 Device
31 Perforated layer
32 Metallic tissue (air-permeable structure)
33 Air flow
34 Substructure
35 Transverse edge
36 Transverse edge
37 Metallic tissue
38 Metallic tissue
39 Borehole (perforated layer)
40 Turbulent air flow
41 Intermediate space
42 Pump
43 Suction line
44 Pressure line
45 Rear space
46 Separating wall
47 Electrical line
48 Electrical line

What is claimed is:

1. A device for reducing the aerodynamic drag of a leading surface of an aircraft comprising:
    at least one air permeable cavity-less structure disposed in an area of the leading surface; and
    a suction device configured to interact with the at least one air permeable structure,
    wherein the at least one air permeable cavity-less structure includes at least two air permeable layers each having different flow resistances, the at least two air permeable layers including a first air permeable layer arranged on an outside of the leading surface of the aircraft and a second air permeable layer abutting an entire surface of the first air permeable layer on an inside of the leading surface of the aircraft such that the suction device draws the air flowing through a region at which the first air permeable layer abuts the second air permeable layer.

2. The device as recited in claim 1, wherein the leading surface is part of one of a vertical tailplane, a horizontal tailplane, an airfoil, and a fuselage section.

3. The device as recited in claim 1, wherein the second air permeable cavity-less layer includes a metallic tissue made of at least one of a high-grade steel alloy and a titanium alloy.

4. The device as recited in claim 1, further comprising a perforated layer having a plurality of boreholes, wherein the perforated layer includes at least one of a titanium alloy and a high-grade steel alloy and configured to cover the at least one air permeable cavity-less structure.

5. The device as recited in claim 4, further comprising a substructure configured to secure at least one of the at least one air permeable cavity-less structure and the perforated layer in the area of the leading surface.

6. The device as recited in claim 4, wherein at least one of the at least one air permeable cavity-less structure and the perforated layer is integrated into a surface geometry of the leading surface.

7. The device as recited in claim 1, wherein the suction device includes a pump configured to generate a negative pressure in an area behind the at least one permeable structure.

8. The device as recited in claim 7, further comprising a controlling/regulating device configured to determine the negative pressure of the pump.

9. The device as recited in claim 3, further comprising a perforated layer having a plurality of boreholes, the perforated layer being disposed over the metallic tissue of the at least one air permeable cavity-less structure.

* * * * *